(12) United States Patent
Shibata

(10) Patent No.: US 9,539,859 B2
(45) Date of Patent: Jan. 10, 2017

(54) PNEUMATIC TIRE AND LAMINATE

(75) Inventor: Hirokazu Shibata, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/701,144

(22) PCT Filed: Jun. 2, 2011

(86) PCT No.: PCT/JP2011/063186
§ 371 (c)(1),
(2), (4) Date: Nov. 30, 2012

(87) PCT Pub. No.: WO2011/155547

PCT Pub. Date: Dec. 15, 2011

(65) Prior Publication Data

US 2013/0078477 A1 Mar. 28, 2013

(30) Foreign Application Priority Data

Jun. 8, 2010 (JP) .............................. 2010-131246
Dec. 7, 2010 (JP) .............................. 2010-272847
Feb. 2, 2011 (JP) .............................. 2011-021120

(51) Int. Cl.
| | | |
|---|---|---|
| B60C 1/00 | (2006.01) | |
| B32B 25/08 | (2006.01) | |
| B32B 27/06 | (2006.01) | |
| B32B 27/26 | (2006.01) | |
| C08L 21/00 | (2006.01) | |
| C08L 77/02 | (2006.01) | |
| C08L 77/06 | (2006.01) | |
| C08K 3/06 | (2006.01) | |
| C08L 61/06 | (2006.01) | |
| C08L 61/12 | (2006.01) | |

(52) U.S. Cl.
CPC ............. *B60C 1/00* (2013.01); *B32B 25/08* (2013.01); *B32B 27/06* (2013.01); *B32B 27/26* (2013.01); *B60C 1/0008* (2013.04); *C08K 3/06* (2013.01); *C08L 21/00* (2013.01); *C08L 77/02* (2013.01); *C08L 77/06* (2013.01); *B32B 2270/00* (2013.01); *B32B 2274/00* (2013.01); *B32B 2605/08* (2013.01); *B60C 2005/145* (2013.04); *C08L 61/06* (2013.01); *C08L 61/12* (2013.01); *Y10T 428/31739* (2015.04); *Y10T 428/31826* (2015.04); *Y10T 428/31833* (2015.04); *Y10T 428/31931* (2015.04)

(58) Field of Classification Search
CPC ....... C08L 21/00; C08L 2666/16; C08L 61/06; C08L 61/12; C08L 77/02; C08L 77/06; B32B 2270/00; B32B 2274/00; B32B 25/08; B32B 2605/08; B32B 27/06; B32B 27/26; B60C 1/00; B60C 1/0008; B60C 2005/145; C08K 3/06; Y10T 428/31739; Y10T 428/31826; Y10T 428/31833; Y10T 428/31931
See application file for complete search history.

(56) References Cited

U.S. PATENT DOCUMENTS

| | | | | |
|---|---|---|---|---|
| 5,851,323 | A * | 12/1998 | Kaido et al. .................. | 152/510 |
| 5,992,486 | A | 11/1999 | Katsuki et al. | |
| 6,534,578 | B1 | 3/2003 | Daikai et al. | |
| 2002/0068797 | A1 | 6/2002 | Ikemoto et al. | |
| 2004/0226643 | A1 | 11/2004 | Yagi et al. | |
| 2008/0314491 | A1 | 12/2008 | Soeda et al. | |
| 2009/0065118 | A1* | 3/2009 | Morooka ...................... | 152/510 |
| 2009/0068476 | A1* | 3/2009 | Kirino .......................... | 428/448 |

(Continued)

FOREIGN PATENT DOCUMENTS

| | | | |
|---|---|---|---|
| EP | 0706878 | A2 | 4/1996 |
| EP | 1782966 | A1 | 5/2007 |
| EP | 2154006 | A1 | 2/2010 |
| EP | 2316881 | A1 | 5/2011 |
| EP | 2657010 | A1 | 10/2013 |

OTHER PUBLICATIONS

Machine translation of JP 2008069207 (2013).*
Machine translation of JP 2009248770 (2013).*
Russian Decision on Grant issued Apr. 25, 2013 in counterpart RU Appln No. 2012157766/05.
XP002727172—English language Abstract for WO 2011/027703.
Extended European Search Report issued Jul. 22, 2014 in counterpart European Appln No. 11792504.0.

*Primary Examiner* — Callie Shosho
*Assistant Examiner* — John Freeman
(74) *Attorney, Agent, or Firm* — Polsinelli PC

(57) ABSTRACT

In a pneumatic tire containing as an inner liner material a laminate of a film of a thermoplastic resin or a thermoplastic elastomer composition and a layer of a rubber composition for improving the adhesive strength between the film and the rubber composition, the rubber composition comprises 100 parts by weight of a rubber component, 0.5 to 20 parts by weight of a condensate between a compound expressed by formula (1):

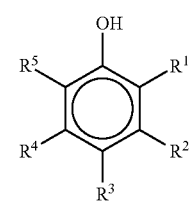

(1)

wherein $R^1$, $R^2$, $R^3$, $R^4$ and $R^5$ are hydrogen, a hydroxyl group or a C1 to C8 alkyl group, and formaldehyde, 0.25 to 200 parts by weight of a methylene donor, and a vulcanizing agent; and a weight ratio of the methylene donor content to the condensate content is 0.5 to 10.

16 Claims, No Drawings

(56) References Cited

U.S. PATENT DOCUMENTS

| | | |
|---|---|---|
| 2009/0131592 A1 | 5/2009 | Sakai et al. |
| 2009/0218024 A1 | 9/2009 | Tsou et al. |
| 2010/0071823 A1 | 3/2010 | Tomoi |
| 2012/0103487 A1* | 5/2012 | Majumdar ............... 152/209.5 |

FOREIGN PATENT DOCUMENTS

| | | | |
|---|---|---|---|
| EP | 2657044 A1 | | 10/2013 |
| JP | 09-239905 A | | 9/1997 |
| JP | 2001-049063 A | | 2/2001 |
| JP | 2002-179861 A | | 6/2002 |
| JP | 2003-097644 A | | 4/2003 |
| JP | 2004-042495 A | | 2/2004 |
| JP | 2008069207 A | * | 3/2008 |
| JP | 2008-308015 A | | 12/2008 |
| JP | 2009248770 A | * | 10/2009 |
| JP | 2010-111794 A | | 5/2010 |
| RU | 2008121213 A | | 12/2009 |
| WO | WO-2007/043489 A1 | | 4/2007 |
| WO | WO-2011027703 A1 | | 3/2011 |

\* cited by examiner

PNEUMATIC TIRE AND LAMINATE

CROSS REFERENCE TO RELATED APPLICATIONS

This application is a National Phase filing under 35 U.S.C. §371 of PCT/JP2011/063186 filed on Jun. 2, 2011; and this application claims priority to Application No. 2010-131246 filed in Japan on Jun. 8, 2010, Application No. 2010-272847 filed in Japan on Dec. 7, 2011, and Application No. 2011-021120 filed in Japan on Feb. 2, 2011, under 35 U.S.C. §119; the entire contents of all are hereby incorporated by reference.

TECHNICAL FIELD

The present invention relates to a pneumatic tire and a laminate. More specifically, the present invention relates to a pneumatic tire containing as an inner liner material a laminate of a film of a thermoplastic resin or a thermoplastic elastomer composition and a layer of a rubber composition, and a laminate of a film of a thermoplastic elastomer composition and a layer of a rubber composition.

BACKGROUND ART

Japanese Unexamined Patent Publication No. 9-239905 discloses a laminate of a polyamide resin layer and a rubber layer usable as an inner liner layer for a pneumatic tire, in which the rubber layer contains an N-alkoxymethylurea derivative, and the rubber layer and/or the polyamide resin layer contains at least a resorcinol/formaldehyde condensate, in order to improve the adhesive property between the polyamide resin layer and the rubber layer.

Japanese Unexamined Patent Publication No. 2003-97644 discloses a laminate comprising two layers of polyamide resin and between them a rubber vibration insulator layer, which is composed of a vulcanized rubber composition containing as indispensable components (A) a diene rubber or rubber having a methylene group, (B) a vulcanizing agent, (C) resorcinol or a derivative compound thereof, and (D) a melamine resin, and is chemically bonding to the polyamide resin layers. However, the laminate is used in a small mount. Japanese Unexamined Patent Publication No. 2003-97644 does not teach the use of the laminate for a pneumatic tire.

Japanese Unexamined Patent Publication No. 2004-42495 discloses a laminate comprising a rubber layer composed of (A) at least one of an acrylonitrile/butadiene copolymer rubber and a hydrogenated acrylonitrile/butadiene copolymer rubber, (B) a peroxide vulcanizing agent, (C) resorcinol or a derivative compound thereof, and (D) a melamine resin, and a metallic foil and a resin film laminated on a circumferential surface of the rubber layer. However, the laminate is used as a gasoline fuel hose. Japanese Unexamined Patent Publication No. 2004-42495 does not teach the use of the laminate for a pneumatic tire.

SUMMARY OF INVENTION

Technical Problem

An object of the present invention is to provide a pneumatic tire containing as an inner liner material a laminate of a film of a thermoplastic resin or a thermoplastic elastomer composition and a layer of a rubber composition, to improve the adhesive strength between the film and the rubber.

Solution to Problem

The first aspect of the present invention is a pneumatic tire comprising a laminate composed of a film of a thermoplastic resin or a thermoplastic elastomer composition and a layer of a rubber composition, wherein the rubber composition comprises
100 parts by weight of a rubber component,
0.5 to 20 parts by weight of a condensate between a compound expressed by formula (1):

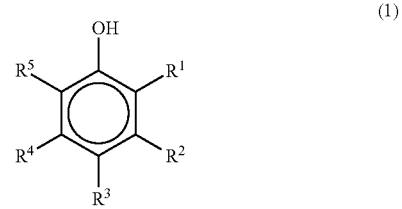

wherein $R^1$, $R^2$, $R^3$, $R^4$ and $R^5$ are hydrogen, a hydroxyl group or a C1 to C8 alkyl group, and formaldehyde,
0.25 to 200 parts by weight of a methylene donor, and
a vulcanizing agent; and
a weight ratio of the methylene donor to the condensate is 0.5 to 10.

The second aspect of the present invention is a laminate comprising a film of a thermoplastic elastomer composition and a layer of a rubber composition, wherein the rubber composition comprises
100 parts by weight of a rubber component,
0.5 to 20 parts by weight of a condensate between a compound expressed by formula (1):

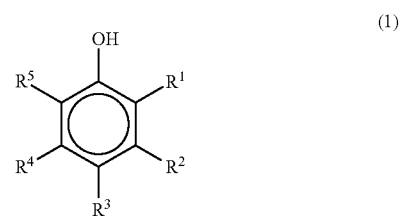

wherein $R^1$, $R^2$, $R^3$, $R^4$ and $R^5$ are hydrogen, a hydroxyl group or a C1 to C8 alkyl group, and formaldehyde,
0.25 to 200 parts by weight of a methylene donor, and
a vulcanizing agent; and
a weight ratio of the methylene donor to the condensate is 0.5 to 10.

More specifically the present invention includes the following embodiments [1] to [19].

[1] A pneumatic tire comprising a laminate composed of a film of a thermoplastic resin or a thermoplastic elastomer composition and a layer of a rubber composition, wherein the rubber composition comprises 100 parts by weight of a rubber component, 0.5 to 20 parts by weight of a condensate between a compound expressed by formula (1):

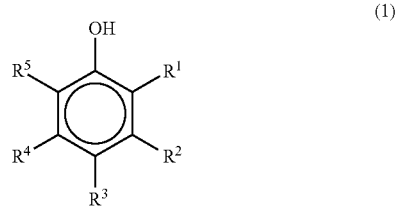

wherein $R^1$, $R^2$, $R^3$, $R^4$ and $R^5$ are hydrogen, a hydroxyl group or a C1 to C8 alkyl group, and formaldehyde, 0.25 to 200 parts by weight of a methylene donor, and a vulcanizing agent; and a weight ratio of the methylene donor to the condensate is 0.5 to 10.

[2] The pneumatic tire according to [1], wherein the rubber component contains diene rubber, the vulcanizing agent is sulfur, and the rubber composition does not contain a vulcanization accelerator.

[3] The pneumatic tire according to [1], wherein the rubber component contains diene rubber, the vulcanizing agent is sulfur, the rubber composition further contains a vulcanization accelerator, the content of the condensate is more than 3 parts by weight but not more than 20 parts by weight based on 100 parts by weight of the rubber component, and the content of the methylene donor is more than 1.5 parts by weight but not more than 200 parts by weight based on 100 parts by weight of the rubber component.

[4] The pneumatic tire according to [1], wherein the rubber component contains diene rubber, the vulcanizing agent is sulfur, the rubber composition further contains a vulcanization accelerator, the content of the condensate is 0.5 to 3 parts by weight based on 100 parts by weight of the rubber component, the content of the methylene donor is 0.25 to 30 parts by weight based on 100 parts by weight of the rubber component, the content of sulfur is less than 4 parts by weight based on 100 parts by weight of the rubber component, and the content of the vulcanization accelerator is more than 0 part by weight but less than 2.1 parts by weight based on 100 parts by weight of the rubber component.

[5] The pneumatic tire according to [4], wherein the vulcanization accelerator is a compound having a structure of sulfenamide, and the content of the compound having a structure of sulfenamide is more than 0 part by weight but less than 1.5 parts by weight.

[6] The pneumatic tire according to [5], wherein the rubber composition contains as the vulcanization accelerator a compound having a structure of sulfenamide and a compound having a structure of thiuram, and the content of the compound having a structure of thiuram is more than 0 part by weight but less than 0.6 part by weight.

[7] The pneumatic tire according to any one of [1] to [6], wherein the thermoplastic resin is at least one selected from the group consisting of poly(vinyl alcohol), an ethylene-vinyl alcohol copolymer, nylon 6, nylon 66, nylon 11, nylon 12, nylon 610, nylon 612, nylon 6/66, nylon MXD6, and nylon 6T.

[8] The pneumatic tire according to any one of [1] to [7], wherein the thermoplastic elastomer composition comprises a thermoplastic resin component and an elastomer component dispersed in the thermoplastic resin component; the thermoplastic resin component is at least one selected from the group consisting of polyvinyl alcohol, an ethylene-vinyl alcohol copolymer, nylon 6, nylon 66, nylon 11, nylon 12, nylon 610, nylon 612, nylon 6/66, nylon MXD6 and nylon 6T; and the elastomer component is at least one selected from the group consisting of a brominated isobutylene-p-methylstyrene copolymer, a maleic anhydride-modified ethylene-α-olefin copolymer, an ethylene-glycidyl methacrylate copolymer and a maleic anhydride-modified ethylene-ethyl acrylate copolymer.

[9] The pneumatic tire according to any one of [1] to [8], wherein in formula (1) at least one of $R^1$, $R^2$, $R^3$, $R^4$ and $R^5$ is a C1 to C8 alkyl group, and the remainder are hydrogen or a C1 to C8 alkyl group.

[10] The pneumatic tire according to any one of [1] to [9], wherein the condensate is a compound expressed by formula (2):

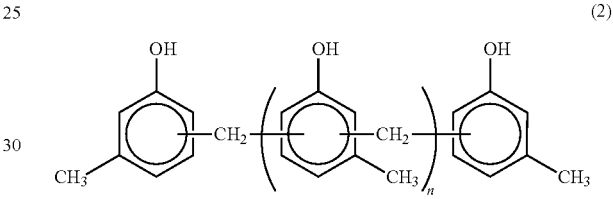

wherein n is an integer of 1 to 20.

[11] The pneumatic tire according to [1], wherein in formula (1) at least one of $R^1$, $R^2$, $R^3$, $R^4$ and $R^5$ is a hydroxyl group, and the remainder are hydrogen or a C1 to C8 alkyl group.

[12] The pneumatic tire according to [11], wherein the condensate is a compound expressed by formula (3):

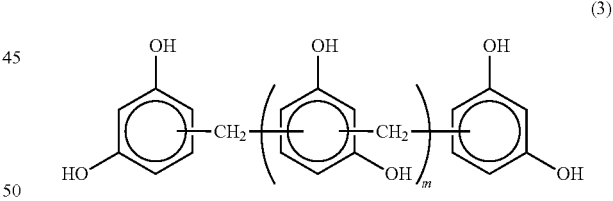

wherein m is an integer of 1 to 20.

[13] The pneumatic tire according to [11] or [12], wherein the thermoplastic resin comprises an ethylene-vinyl alcohol copolymer having an ethylene content of 5 to 55% by mol, and the content of the ethylene-vinyl alcohol copolymer is 5 to 100% by weight based on the total amount of the thermoplastic resin.

[14] The pneumatic tire according to [11] or [12], wherein the thermoplastic elastomer composition comprises a thermoplastic resin component and an elastomer component dispersed in the thermoplastic resin component, the thermoplastic resin component comprises an ethylene-vinyl alcohol copolymer having an ethylene content of 5 to 55% by mol, and the content of the ethylene-vinyl alcohol copolymer is 5 to 100% by weight based on the total amount of the thermoplastic resin component.

[15] The pneumatic tire according to any one of [1] to [14], wherein the methylene donor is at least one selected from the group consisting of a modified etherified methylolmelamine, paraformaldehyde, hexamethylenetetramine, pentamethylenetetramine, and hexamethoxymethylmelamine.

[16] The pneumatic tire according to any one of [1] to [15], wherein the rubber component comprises a butadiene rubber.

[17] The pneumatic tire according to [16], wherein the rubber component comprises 10 to 100% by weight of a butadiene rubber based on the total amount of the rubber component.

[18] A laminate comprising a film of a thermoplastic elastomer composition and a layer of a rubber composition, wherein the rubber composition comprises
  100 parts by weight of a rubber component,
  0.5 to 20 parts by weight of a condensate between a compound expressed by formula (1):

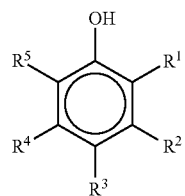

(1)

wherein $R^1$, $R^2$, $R^3$, $R^4$ and $R^5$ are hydrogen, a hydroxyl group or a C1 to C8 alkyl group, and formaldehyde,
  0.25 to 200 parts by weight of a methylene donor, and
  a vulcanizing agent; and
  a weight ratio of the methylene donor to the condensate is 0.5 to 10.

[19] The laminate according to [18], wherein the condensate is a compound expressed by formula (3):

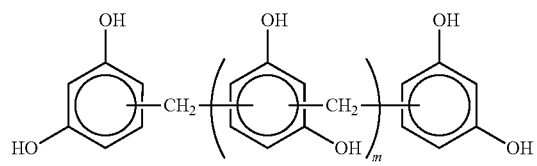

(3)

wherein m is an integer of 1 to 20.

Advantageous Effects of Invention

A pneumatic tire according to the present invention comprises a laminate composed of a film of a thermoplastic resin or a thermoplastic elastomer composition and a layer of a rubber composition, and the rubber composition comprises a condensate having a phenol structure and a basic component generating formaldehyde at a specific content, and the contents of sulfur and a vulcanization accelerator are adjusted, so that the adhesive strength at the interface between the film of a thermoplastic resin or a thermoplastic elastomer composition of the layer of the rubber composition is great.

A laminate according to the present invention, in which a condensate having a phenol structure and a basic component generating formaldehyde are blended with a rubber composition at a specific content and the contents of sulfur and a vulcanization accelerator are adjusted, has consequently large adhesive strength at the interface between the film of a thermoplastic resin or a thermoplastic elastomer composition and the layer of the rubber composition, and further is superior in the adhesiveness with a rubber constituting a tier.

DESCRIPTION OF EMBODIMENTS

A pneumatic tire according to the present invention comprises a laminate composed of a film of a thermoplastic resin or a thermoplastic elastomer composition and a layer of a rubber composition, wherein the rubber composition comprises
  100 parts by weight of a rubber component,
  0.5 to 20 parts by weight of a condensate between a compound expressed by formula (1):

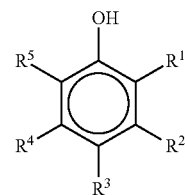

(1)

wherein $R^1$, $R^2$, $R^3$, $R^4$ and $R^5$ are hydrogen, a hydroxyl group or a C1 to C8 alkyl group, and formaldehyde,
  0.25 to 200 parts by weight of a methylene donor, and
  a vulcanizing agent; and a weight ratio of the methylene donor to the condensate is 0.5 to 10.

A laminate according to the present invention comprises a film of a thermoplastic elastomer composition and a layer of a rubber composition, wherein the rubber composition comprises
  100 parts by weight of a rubber component,
  0.5 to 20 parts by weight of a condensate between a compound expressed by formula (1):

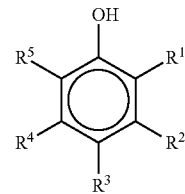

(1)

wherein $R^1$, $R^2$, $R^3$, $R^4$ and $R^5$ are hydrogen, a hydroxyl group or a C1 to C8 alkyl group, and formaldehyde,
  0.25 to 200 parts by weight of a methylene donor, and
  a vulcanizing agent; and
  a weight ratio of the methylene donor to the condensate is 0.5 to 10.

Examples of a thermoplastic resin constituting the film include a polyamide resin, a polyester resin, a polynitrile resin, a polymethacrylate resin, a polyvinyl resin, a cellulose resin, a fluorocarbon resin, an imide resin, a polystyrene resin, and a polyolefin resin. Examples of the polyamide resin include nylon 6 (N6), nylon 66 (N66), nylon 46 (N46), nylon 11 (N11), nylon 12 (N12), nylon 610 (N610), nylon 612 (N612), nylon 6/66 (N6/66), nylon 6/66/12 (N6/66/12), nylon 6/66/610 (N6/66/610), nylon MXD6 (MXD6), nylon 6T, nylon 6/6T, nylon 9T, a nylon 66/PP copolymer, and a nylon 66/PPS copolymer. Examples of the polyester resin include an aromatic polyester, such as poly(butylene terephthalate) (PBT), poly(ethylene terephthalate) (PET), poly(ethylene isophthalate) (PEI), a PET/PEI copolymer, polyarylate (PAR), poly(butylene naphthalate) (PBN), a liquid crystal polyester, and a polyoxyalkylene diimidic acid/polybutyrate-terephthalate copolymer. Examples of the polynitrile resin include polyacrylonitrile (PAN), polymethacrylonitrile, an acrylonitrile/styrene copolymer (AS), a methacrylonitrile/styrene copolymer, and a methacrylonitrile/styrene/butadiene copolymer. Examples of the polymethacrylate resin include poly(methyl methacrylate) (PMMA), and poly(ethyl methacrylate). Examples of the polyvinyl resin include poly(vinyl acetate) (PVAc), poly(vinyl alcohol) (PVA), an ethylene/vinyl alcohol copolymer (EVOH), poly(vinylidene chloride) (PVDC), poly(vinyl chloride) (PVC), a vinyl chloride/vinylidene chloride copolymer, and a vinylidene chloride/methyl acrylate copolymer. Examples of the cellulose resin include cellulose acetate, and cellulose acetate butyrate. Examples of the fluorocarbon resin include poly(vinylidene fluoride) (PVDF), poly(vinyl fluoride) (PVF), polychlorofluoroethylene (PCTFE), and a tetrafluoroethylene/ethylene copolymer (ETFE). Examples of the imide resin include an aromatic polyimide (PI). Examples of the polystyrene resin include polystyrene (PS). Examples of the polyolefin resin include polyethylene (PE), and polypropylene (PP).

Among them poly(vinyl alcohol), an ethylene/vinyl alcohol copolymer, nylon 6, nylon 66, nylon 11, nylon 12, nylon 610, nylon 612, nylon 6/66, nylon MXD6, and nylon 6T are preferable from a viewpoint of satisfying both resistance to fatigue and an air barrier.

Into the thermoplastic resin, in order to improve processability, dispersibility, heat resistance, oxidation resistance, etc., an additive ingredient to be blended generally into a resin composition, such as a filler, a reinforcing agent, a processing aid, a stabilizer, and an antioxidant, may be added to the extent that it should not disturb advantageous effects of the present invention. Although a plasticizer should not be added from the viewpoints of an air barrier and heat resistance, it may be added so that the advantageous effects of the present invention are maintained.

A thermoplastic elastomer composition constituting the film is a composition comprising a thermoplastic resin component and an elastomer component dispersed in the thermoplastic resin component, where the thermoplastic resin component constitutes a matrix phase and the elastomer component constitutes a disperse phase.

As a thermoplastic resin component constituting the thermoplastic elastomer composition the same thermoplastic resins as listed above can be used.

Examples of an elastomer component constituting the thermoplastic elastomer composition include diene rubber and hydrogenated products thereof, olefin rubber, halogen-containing rubber, silicone rubber, sulfur-containing rubber, and fluorocarbon rubber. Examples of the diene rubber and hydrogenated products thereof include natural rubber (NR), isoprene rubber (IR), epoxidized natural rubber, styrene/butadiene rubber (SBR), butadiene rubber (BR) (high-cis BR and low-cis BR), acrylonitrile butadiene rubber (NBR), hydrogenated NBR, and hydrogenated SBR. Examples of the olefin rubber include ethylene propylene rubber (EPM), ethylene propylene diene rubber (EPDM), maleic acid-modified ethylene propylene rubber (M-EPM), a maleic anhydride-modified ethylene/α-olefin copolymer, an ethylene/glycidyl methacrylate copolymer, a maleic anhydride-modified ethylene/ethyl acrylate copolymer (modified EEA), butyl rubber (IIR), copolymer of isobutylene and an aromatic vinyl or diene monomer, acrylic rubber (ACM), and an ionomer. Examples of the halogen-containing rubber include a halogenated butyl rubber, such as a brominated butyl rubber (Br-IIR) and chlorinated butyl rubber (Cl-IIR), brominated isobutylene/p-methyl styrene copolymer (BIMS), halogenated isobutylene/isoprene copolymer rubber, chloroprene rubber (CR), epichlorohydrin rubber (CHR), a chlorosulfonated polyethylene(CSM), chlorinated polyethylene (CM), and a maleic acid-modified chlorinated polyethylene (M-CM). Examples of the silicone rubber include methyl vinyl silicone rubber, dimethyl silicone rubber, and methyl phenyl vinyl silicone rubber. Examples of the sulfur-containing rubber include polysulfide rubber. Examples of the fluorocarbon rubber include vinylidene fluoride rubber, fluorine-containing vinyl ether rubber, tetrafluoroethylene/propylene rubber, fluorine-containing silicone rubber, and fluorine-containing phosphazene rubber.

Among them, a brominated isobutylene/p-methylstyrene copolymer, a maleic anhydride-modified ethylene/α-olefin copolymer, an ethylene/glycidyl methacrylate copolymer, and a maleic anhydride-modified ethylene/ethyl acrylate copolymer are preferable from a viewpoint of an air barrier.

Into the elastomer component an additive ingredient to be blended generally to a rubber composition like miscellaneous reinforcing agents (fillers), such as carbon black, and silica, a softening agent, an age resister, a processing aid may be added to the extent that the advantageous effects of the present invention should not be disturbed.

There is no particular restriction on a combination of an elastomer component and a thermoplastic resin component constituting the thermoplastic elastomer composition, and examples thereof include a halogenated butyl rubber and a polyamide resin, brominated isobutylene/p-methylstyrene copolymer rubber and a polyamide resin, a butadiene rubber and a polystyrene resin, an isoprene rubber and a polystyrene resin, hydrogenated butadiene rubber and a polystyrene resin, ethylene propylene rubber and a polyolefin resin, an ethylene propylene diene rubber and a polyolefin resin, an amorphous butadiene rubber and a syndiotactic poly(1,2-polybutadiene), an amorphous isoprene rubber and a trans-poly(1,4-isoprene), and a fluorocarbon rubber and a fluorocarbon resin; while a combination of a butyl rubber and a polyamide resin superior in the air barrier property is preferable, and among others combinations of a brominated isobutylene/p-methylstyrene copolymer rubber (which is a type of modified butyl rubber), and nylon 6/66 or nylon 6, or a blend resin of nylon 6/66 and nylon 6 are especially preferable from a viewpoint of satisfying both the resistance to fatigue and the air barrier.

A thermoplastic elastomer composition can be produced by dispersing an elastomer component as a disperse phase into a thermoplastic resin component forming a matrix phase by means of melt extrusion of the thermoplastic resin component and the elastomer component by, for example, a twin-screw kneader extruder. The weight ratio of a thermoplastic resin component to an elastomer component is, without being limited thereto, preferably 10/90 to 90/10, and more preferably 15/85 to 90/10.

The thermoplastic resin or the thermoplastic elastomer composition may contain various additives to the extent that the advantageous effects of the present invention should not be disturbed.

A rubber composition constituting a layer of a rubber composition contains a rubber component, a condensate of a compound according to formula (1) and formaldehyde, a methylene donor and a vulcanizing agent:

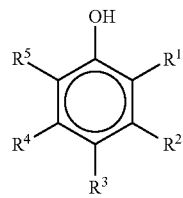

wherein $R^1$, $R^2$, $R^3$, $R^4$ and $R^5$ are hydrogen, a hydroxyl group or a C1 to C8 alkyl group.

Examples of the rubber component include diene rubber and hydrogenated products thereof, olefin rubber, a halogen-containing rubber, silicone rubber, sulfur-containing rubber, and fluorocarbon rubber. Examples of the diene rubber and hydrogenated products thereof include natural rubber (NR), isoprene rubber (IR), epoxidized natural rubber, styrene/butadiene rubber (SBR), butadiene rubber (BR) (high-cis BR and low-cis BR), acrylonitrile butadiene rubber (NBR), a hydrogenated NBR, and a hydrogenated SBR. Examples of the olefin rubber include ethylene propylene rubber (EPM), ethylene propylene diene rubber (EPDM), a maleic acid-modified ethylene propylene rubber (M-EPM), a maleic anhydride-modified ethylene/α-olefin copolymer, an ethylene/glycidyl methacrylate copolymer, a maleic anhydride-modified ethylene/ethyl acrylate copolymer (modified EEA), a butyl rubber (IIR), a copolymer of isobutylene and an aromatic vinyl or diene monomer, an acrylic rubber (ACM), and an ionomer. Examples of the halogen-containing rubber include halogenated butyl rubber, such as brominated butyl rubber (Br-IIR) and chlorinated butyl rubber (Cl-IIR), a brominated isobutylene/p-methylstyrene copolymer (BIMS), halogenated isobutylene/isoprene copolymer rubber, a chloroprene rubber (CR), an epichlorohydrin rubber (CHR), a chlorosulfoned polyethylene (CSM), a chlorinated polyethylene (CM), and a maleic acid-modified chlorinated polyethylene (M-CM). Examples of the silicone rubber include methyl vinyl silicone rubber, a dimethyl silicone rubber, and a methyl phenyl vinyl silicone rubber. Examples of the sulfur-containing rubber include polysulfide rubber. Examples of the fluorocarbon rubber include vinylidene fluoride rubber, fluorine-containing vinyl ether rubber, tetrafluoroethylene/propylene rubber, fluorine-containing silicone rubber, and fluorine-containing phosphazene rubber. Among them, from the viewpoint of co-crosslinking with an adjacent rubber material, diene rubber, olefin rubber, and halogen-containing rubber are preferable, and more preferable are natural rubber, styrene/butadiene rubber, butadiene rubber, brominated butyl rubber, and ethylene/propylene/diene rubber. The rubber component may be a blend of two or more rubber components.

In a preferable example of a compound according to formula (1), at least one of $R^1$, $R^2$, $R^3$, $R^4$ and $R^5$ is a C1 to C8 alkyl group and the remainder are hydrogen or a C1 to C8 alkyl group. A specific preferable example of a compound according to formula (1) is cresol.

In another preferable example of a compound according to formula (1), at least one of $R^1$, $R^2$, $R^3$, $R^4$ and $R^5$ is a hydroxyl group and the remainder are hydrogen or a C1 to C8 alkyl group. Another specific preferable example of a compound according to formula (1) is resorcinol.

Examples of a condensate of a compound according to formula (1) and formaldehyde include a cresol/formaldehyde condensate, and a resorcinol/formaldehyde condensate. The condensates may be modified to the extent that the advantageous effects of the present invention should not be disturbed. For example, a resorcinol/formaldehyde condensate modified by an epoxy compound can be utilized according to the present invention. Such condensates are commercially available, and the commercial products can be utilized according to the present invention.

A condensate of a compound according to formula (1) and formaldehyde is preferably a compound expressed by formula (2) or formula (3):

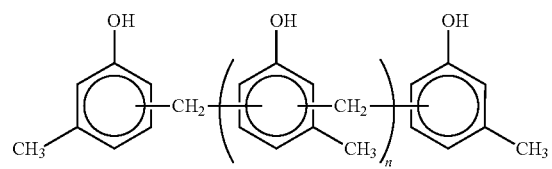

wherein n is an integer of 1 to 20, preferably an integer of 1 to 10, and more preferably an integer of 1 to 5;

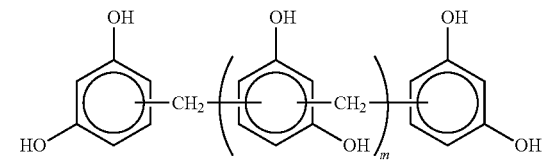

wherein m is an integer of 1 to 20, preferably an integer of 1 to 10, and more preferably an integer of 1 to 3.

A "methylene donor" refers to a basic compound, which generates formaldehyde by heating, etc., and examples thereof include hexamethylenetetramine, pentamethylenetetramine, hexamethylenediamine, methylolmelamine, etherified methylolmelamine, modified etherified methylolmelamine, esterified methylolmelamine, hexamethoxymethylolmelamine, hexamethylolmelamine, hexakis(ethoxymethyl)melamine, hexakis(methoxymethyl)melamine, N,N',N"-trimethyl-N,N',N"-trimethylolmelamine, N,N',N"-trimethylolmelamine, N-methylolmelamine, N,N'-bis(methoxymethyl)melamine, N,N',N"-tributyl-N,N',N"-trimethylolmelamine, and paraformaldehyde. Among them, from the viewpoint of the formaldehyde release temperature, a modified etherified methylolmelamine is preferable.

As a vulcanizing agent there are an inorganic vulcanizing agent and an organic vulcanizing agent; and examples of an inorganic vulcanizing agent include sulfur, sulfur monochloride, selenium, tellurium, zinc oxide, magnesium oxide, and lead monoxide; and examples of an organic vulcanizing agent include a sulfur-containing organic compound, a dithiocarbamic acid salt, oximes, tetrachloro-p-benzoquinone, a dinitroso compound, a modified phenol resin, a polyamine, an organic peroxide. Among them sulfur, an organic peroxide such as 1,3-bis-(t-butylperoxyisopropyl)-benzene, a modified phenol resin such as a brominated alkylphenol/formaldehyde condensate, zinc oxide, and a sulfur-containing organic compound are preferable.

The content of a condensate of a compound according to formula (1) and formaldehyde (hereinafter also referred to simply as "condensate") is 0.5 to 20 parts by weight, and preferably 1 to 10 parts by weight, based on 100 parts by weight of the rubber component. If the content of the condensate is too low, the amount and time required for heating in order to obtain adequate adhesion increases and the vulcanization efficiency decreases, reversely if it is too high, the elongation of a vulcanized product rubber composition is impaired leading to being easily broken.

The content of a methylene donor is 0.25 to 200 parts by weight, preferably 0.5 to 80 parts by weight, and more preferably 1 to 40 parts by weight, based on 100 parts by weight of the rubber component. If the content of a methylene donor is too low, the donor is used up by a resin reaction inside a rubber composition system and a reaction of an interface reaction does not proceed well and the adhesion becomes poor. Reversely, if it is too high, the reaction inside a rubber composition system may be accelerated too much, or a crosslinking reaction inside an opponent resin system for adhesion may be triggered thereby impairing the adhesion.

The weight ratio of the methylene donor to the condensate content is 0.5 to 10, preferably 1 to 4, and more preferably 1 to 3. If the ratio is too small, the donor is used up by a resin reaction inside a rubber composition system and a reaction of an interface reaction does not proceed well and the adhesion is poor. Reversely, if it is too large, the reaction inside a rubber composition system may be accelerated too much, or a crosslinking reaction inside an opponent resin system for adhesion may be triggered thereby impairing the adhesion.

If the rubber component contains a diene rubber and the vulcanizing agent is sulfur, it is preferable that the rubber composition does not contain a vulcanization accelerator.

If the rubber component contains a diene rubber, the vulcanizing agent is sulfur, and further the rubber component contains a vulcanization accelerator, it is preferable that the content of the condensate is more than 3 parts by weight, but not more than 20 parts by weight based on 100 parts by weight the rubber component, and the content of the methylene donor is preferably more than 1.5 parts by weight, but not more than 200 parts by weight, more preferably more than 3 parts by weight, but not more than 80 parts by weight, based on 100 parts by weight of the rubber component. If the content of the condensate is too low, the condensate reacts with a vulcanization accelerator hindering the progress of a reaction with a resin at the interface. Reversely, if it is too high, the elongation of a vulcanized product rubber composition is impaired leading to being easily broken. If the content of a methylene donor is too low, the donor is used up by a resin reaction inside a rubber composition system and a reaction of an interface reaction does not proceed well and the adhesion becomes poor. Reversely, if it is too high, the reaction inside a rubber composition system may be accelerated too much, or a crosslinking reaction inside an opponent resin system for adhesion may be triggered thereby impairing the adhesion.

Examples of a vulcanization accelerator includes an aldehyde/ammonia type, an aldehyde/amine type, a thiourea type, a guanidine type, a thiazole type, a sulfenamide type, a thiuram type, a dithiocarbamic acid salt type, and a xanthogenic acid salt type, and preferable are a thiazole type, a sulfenamide type, and a thiuram type.

A thiazole type vulcanization accelerator is a compound having a thiazole structure, and examples thereof include di-2-benzothiazolyldisulfide, mercaptobenzothiazole, benzothiazyldisulfide, mercaptobenzothiazole zinc salt, (dinitrophenyl)mercaptobenzothiazole, and (N,N-diethylthiocarbamoylthio)benzothiazole; and among them di-2-benzothiazolyldisulfide is preferable.

A sulfenamide type vulcanization accelerator is a compound having a sulfenamide structure, and examples thereof include N-cyclohexylbenzothiazole sulfenamide, N-t-butylbenzothiazole sulfenamide, N-oxydiethylenebenzothiazole sulfenamide, N,N-dicyclohexylbenzothiazole sulfenamide, and (morpholinodithio)benzothiazole; and among them N-t-butyl-2-benzothiazole sulfenamide is preferable.

A thiuram type vulcanization accelerator is a compound having a thiuram structure, and examples thereof include tetrakis(2-ethylhexyl)thiuram disulfide, tetramethylthiuram disulfide, tetramethylthiuram monosulfide, tetraethylthiuram disulfide, tetrabutylthiuram disulfide, and dipentamethylenethiuram hexasulfide; and among them tetrakis(2-ethylhexyl)thiuram disulfide is preferable.

If the rubber component contains diene rubber, the vulcanizing agent is sulfur, the rubber component further contains a vulcanization accelerator, the content of the condensate is 0.5 to 3 parts by weight based on 100 parts by weight of the rubber component, and the content of the methylene donor is 0.25 to 30 parts by weight based on 100 parts by weight of the rubber component, it is preferable that the sulfur content be less than 4 parts by weight based on 100 parts by weight of the rubber component, and the vulcanization accelerator content be more than 0 part by weight but less than 2.1 parts by weight based on 100 parts by weight of the rubber component. If the sulfur content is too high, a competing reaction with the condensate proceeds inside a rubber composition system, the adhesion is impaired. If a vulcanization accelerator is not contained, the vulcanization reaction proceeds barely, and the vulcanization efficiency decreases. Reversely, if the vulcanization accelerator content is too high, a condensate reacts with a vulcanization accelerator and a reaction with a resin at the interface will not easily proceed.

In this case, if the vulcanization accelerator is a compound having a sulfenamide structure, the content of a compound having a sulfenamide structure is preferably more than 0 part by weight but less than 1.5 parts by weight. If a compound having a sulfenamide structure is not contained, a vulcanization reaction proceeds barely and the vulcanization efficiency is impaired; and reversely if the content of a compound having a sulfenamide structure is too high, a reaction of the accelerator competes against a reaction of a resin disturbing an adhesion reaction.

In this case, if a rubber composition contains as a vulcanization accelerator a compound having a sulfenamide structure and a compound having a thiuram structure, the content of a compound having a thiuram structure is preferably more than 0 part by weight but less than 0.6 part by weight. If a compound having a thiuram structure is not contained, the adhesion effect becomes sensitive to the sulfur content, and reversely if the content of a compound having a thiuram structure is too high, an adhesion reaction is disturbed by released sulfur.

A rubber component contains preferably diene rubber. Examples of diene rubber include natural rubber (NR), isoprene rubber (IR), styrene/butadiene rubber (SBR), butadiene rubber (BR), and acrylonitrile/butadiene rubber (NBR). Among them, from the viewpoint of co-crosslinking with an adjacent rubber material, natural rubber, styrene/butadiene rubber, butadiene rubber, isoprene rubber, and a mixture thereof are preferable. The content rate of diene rubber in a rubber component is preferably 50% by weight or higher, more preferably 70% by weight or higher, and further preferably all the rubber component is diene rubber.

A rubber component contains more preferably a butadiene rubber. In this case, 10 to 100% by weight of the rubber component is preferably a butadiene rubber, more preferably 50 to 98% by weight of the rubber component is a butadiene rubber, and further preferably 70 to 95% by weight of the rubber component is a butadiene rubber. If a rubber component contains a rubber component other than butadiene rubber, the rubber component other than butadiene rubber is preferably natural rubber or isoprene rubber. In other words, as a rubber component a combination of butadiene rubber and natural rubber or a combination of butadiene rubber and isoprene rubber is especially preferable.

A combination of a film containing an ethylene/vinyl alcohol copolymer and a rubber composition containing a condensate of a compound according to formula (1), in which at least one of $R^1$, $R^2$, $R^3$, $R^4$ and $R^5$ is a hydroxyl group, and the remainder are hydrogen or a C1 to C8 alkyl group, and formaldehyde is especially preferable, because the adhesive property at the interface between the film and a layer of the rubber composition is excellent.

In this connection, a film containing an ethylene/vinyl alcohol copolymer means a thermoplastic resin film, wherein the thermoplastic resin contains an ethylene/vinyl alcohol copolymer, or a thermoplastic elastomer composition film, wherein a thermoplastic resin component constituting the thermoplastic elastomer composition contains an ethylene/vinyl alcohol copolymer. In the case of a thermoplastic resin film, the content of an ethylene/vinyl alcohol copolymer is preferably 5 to 100% by weight based on the total amount of the thermoplastic resin, and more preferably 20 to 70% by weight; and in the case of a thermoplastic elastomer composition film, it is preferably 5 to 100% by weight based on the total amount of the thermoplastic resin, and more preferably 20 to 70% by weight.

An ethylene/vinyl alcohol copolymer (hereinafter also referred to as "EVOH") is a copolymer composed of an ethylene unit (—$CH_2CH_2$—) and a vinyl alcohol unit (—$CH_2$—CH(OH)—), but it may contain in addition to the ethylene unit and the vinyl alcohol unit another constituting unit to the extent that the advantageous effects of the present invention should not be disturbed. An ethylene/vinyl alcohol copolymer with the ethylene unit content, namely the ethylene content of preferably 5 to 55% by mol, more preferably 20 to 50% by mol should be used. If the ethylene content of an ethylene/vinyl alcohol copolymer is too low, the compatibility with a polyamide resin becomes poor. Reversely, if the ethylene content is too high, the number of hydroxyl groups contained in a thermoplastic resin decreases and consequently increase of the adhesion force cannot be expected. An ethylene/vinyl alcohol copolymer is a saponified product of an ethylene/vinyl acetate copolymer, and the degree of saponification thereof is preferably 90% or higher, and more preferably 99% or higher. If the degree of saponification of an ethylene/vinyl alcohol copolymer is too low, the air barrier property deteriorates, and the thermal stability deteriorates too. An ethylene/vinyl alcohol copolymer is commercially available, and is available under the trade name of Soarnol® from Nippon Synthetic Chemical Industry Co., Ltd. and under the trade name of Eval® from Kuraray Co., Ltd. Examples of an ethylene/vinyl alcohol copolymer with the ethylene content of 5 to 55% by mol include Soarnol® H4815B (having a ethylene content of 48% by mol), A4412B (having an ethylene content of 42% by mol), DC3212B (having an ethylene content of 32% by mol), and V2504RB (having an ethylene content of 25% by mol) from Nippon Synthetic Chemical Industry Co., Ltd. and Eval® L171B (having an ethylene content of 27% by mol), H171B (having an ethylene content of 38% by mol), and E171B (having an ethylene content of 44% by mol) from Kuraray Co., Ltd.

A laminate according to the present invention can be produced by overlaying a rubber composition on a film of a thermoplastic resin or a thermoplastic elastomer composition. More particularly, but without limitation thereto, it can be produced as follows. Firstly, a thermoplastic resin or a thermoplastic elastomer composition is formed into a film by a forming machine, such as a blown film extrusion device, and a T-die extruder to produce a film of a thermoplastic resin or an thermoplastic elastomer composition. Next, a rubber composition is extruded by a T-die extruder, etc., onto the film and laminated simultaneously to complete a laminate.

A pneumatic tire according to the present invention can be produced according to a conventional process. For example, on a tire building drum a laminate according to the present invention is placed as an inner liner material facing the thermoplastic resin or thermoplastic elastomer composition film side to the tire building drum, thereon components, such as a carcass ply, a belt ply, and a tread ply composed of unvulcanized rubber, used conventionally for producing a tire, are laminated successively, the block is shaped, then the drum is removed to complete a green tire, and then the green tire is vulcanized by heating according to a conventional method to complete a pneumatic tire.

Examples (1) Production of Film

Raw materials were blended according to the recipe shown in Table 1 to prepare a thermoplastic elastomer composition, and the thermoplastic elastomer composition was formed by a blown film extrusion device into a film having a thickness of 0.2 mm. The produced film is designated as Film A.

TABLE 1

| Recipe of thermoplastic elastomer composition (1) | | parts by weight |
|---|---|---|
| BIMS[a] | "Exxpro ™ 3035" by ExxonMobil Chemical | 100 |
| Zinc oxide | "Zinc white No. 3" by Seido Chemical Industry Co., Ltd. | 0.5 |
| Stearic acid | Stearic acid for industrial use | 0.2 |
| Zinc stearate | "Zinc stearate" by NOF Corporation | 1 |
| N 6/66 | "UBE Nylon 5033B" by Ube Industries, Ltd. | 100 |
| Modified EEA[b] | "HPR-AR201" by DuPont-Mitsui Polychemicals Co., Ltd. | 10 |

Remarks:
[a] A brominated isobutylene-p-methylstyrene copolymer
[b] A maleic anhydride-modified ethylene/ethyl acrylate copolymer Raw materials were blended according to the recipe shown in Table 2 to prepare a thermoplastic elastomer composition, and the thermoplastic elastomer composition was formed by a blown film extrusion device to a 0.2-mm thick film. The produced film is designated as Film B.

TABLE 2

Recipe of thermoplastic elastomer composition (2)

|  |  | parts by weight |
|---|---|---|
| BIMS[a] | "Exxpro ™ 3035" by ExxonMobil Chemical | 100 |
| Zinc oxide | "Zinc white No. 3" by Seido Chemical Industry Co., Ltd. | 0.5 |
| Stearic acid | Stearic acid for industrial use | 0.2 |
| Zinc stearate | "Zinc stearate" by NOF Corporation | 1 |
| N 6/66 | "UBE Nylon 5033B" by Ube Industries, Ltd. | 50 |
| EVOH | "Soarnol ® H4815B" by Nippon Synthetic Chemical Industry Co., Ltd. | 50 |
| Modified EEA[b] | "HPR-AR201" by DuPont-Mitsui Polychemicals Co., Ltd. | 10 |

Remarks:
[a] A brominated isobutylene-p-methylstyrene copolymer
[b] A maleic anhydride-modified ethylene/ethyl acrylate copolymer Nylon 6/66 "UBE Nylon 5013B" by Ube Industries, Ltd. was formed by a blown film extrusion device to a 0.02-mm thick film. The produced film is designated as Film C.

(2) Preparation of Rubber Composition

The following raw materials were blended according to the recipes shown in Table 3 to Table 6 to prepare 26 kinds of rubber compositions.

Styrene/butadiene rubber: "Nipol 1502" by Zeon Corporation

Natural rubber: SIR-20

Butadiene rubber: "Nipol BR1220" by Zeon Corporation

Isoprene rubber: "Nipol IR2200" by Zeon Corporation

Carbon black: "Seast V" by Tokai Carbon Co., Ltd.

Stearic acid: stearic acid for industrial use

Aromatic oil: "Desolex No. 3" by Showa Shell Sekiyu K.K.

Zinc oxide: "Zinc white No. 3" by Seido Chemical Industry Co., Ltd.

Cresol/formaldehyde condensate: "Sumikanol 610" by Taoka Chemical Co., Ltd.

Modified resorcinol/formaldehyde condensate: "Sumikanol 620" by Taoka Chemical Co., Ltd.

Methylene donor: modified etherified methylolmelamine ("Sumikanol 507AP" by Taoka Chemical Co., Ltd.)

Sulfur: 5% oil extended sulfur

Vulcanization accelerator (1): di-2-benzothiazolyldisulfide ("Nocceler DM" by Ouchi-Shinko Chemical Industrial Co., Ltd.)

Vulcanization accelerator (2): N-t-butyl-2-benzothiazole sulfenamide ("Nocceler NS" by Ouchi Chemical Industrial Co., Ltd.)

Vulcanization accelerator (3): tetrakis(2-ethylhexyl)thiuram disulfide ("Nocceler TOT-N" by Ouchi Chemical Industrial Co., Ltd.)

Peroxide: "Perkadox 14/40" (containing 40% 1,3-bis-(t-butylperoxyisopropyl)-benzene) by Kayaku Akzo Corporation Resin crosslinking agent: "Tackirol 250-I" (brominated alkylphenol/formaldehyde condensate) by Taoka Chemical Co., Ltd.

(3) Production of Laminate

On top of Film A and Film C produced according to (1) above, the rubber compositions prepared according to (2) above were respectively extruded with the thickness of 0.7 mm and laminated to produce 52 kinds of laminates.

Further with respect to the rubber compositions of Examples 10 to 14 prepared according to (2) above, laminates with Film B of the thermoplastic elastomer composition produced according to (1) above were also produced.

(4) Evaluation of Laminates

With respect to the produced laminates, the peel strength, tire separation, and tire destruction were evaluated. The evaluation results are shown in Table 3 to Table 6. The evaluation methods for the respective evaluation items are as follows.

[Peel Strength]

After vulcanization a laminate sample was cut to a 25 mm-wide strip, and the peel strength of the strip specimen was measured according to JIS-K6256. The measured peel strength (N/25 mm) was indexed according to the following criteria. Indices other than index 0 fall within an acceptable range.

| Index | Peel strength (N/25 mm) |
|---|---|
| 0 | 0 (inclusive) to 20 (exclusive) |
| 1 | 20 (inclusive) to 25 (exclusive) |
| 2 | 25 (inclusive) to 50 (exclusive) |
| 3 | 50 (inclusive) to 75 (exclusive) |
| 4 | 75 (inclusive) to 100 (exclusive) |
| 5 | 100 (inclusive) to 200 (exclusive) |
| 6 | 200 or higher |

[Tire Separation]

Using the laminate as an inner liner material a tire of 195/65R15 size was constructed according to a conventional process, which was mounted on an FF passenger car of 1800 cc displacement using a 15×6JJ rim at the inner pressure of 200 kPa, and the car logged 30,000 km in city. Thereafter the tire was removed from the rim and the inside was inspected visually to identify existence or nonexistence of a separation trouble in the thermoplastic resin laminate used as an inner liner material. A case without a separation is expressed by "Good", and a case with a separation is expressed by "Bad".

[Tire Destruction]

Using the laminate as an inner liner material a tire of 195/65R15 size was constructed according to a conventional process, which was mounted on an FF passenger car of 1800 cc displacement using a 15×6JJ rim at the inner pressure of 200 kPa, and the car logged 30,000 km in city. Thereafter the tire was removed from the rim and the inside was inspected visually to identify existence or nonexistence of a crack or rift in the thermoplastic resin laminate used as an inner liner material. A case without defective appearance is expressed by "Good", and a case with defective appearance is expressed by "Bad".

TABLE 3

Recipes and evaluation results of rubber compositions

|  |  | Example 1 | Example 2 | Example 3 | Example 4 | Example 5 | Example 6 | Example 7 |
|---|---|---|---|---|---|---|---|---|
| Styrene/butadiene rubber | parts by weight | 50 | 50 | 50 | 50 | 50 | 50 | 50 |
| Natural rubber | parts by weight | 50 | 50 | 50 | 50 | 50 | 50 | 50 |
| Carbon black | parts by weight | 60 | 60 | 60 | 60 | 60 | 60 | 60 |
| Stearic acid | parts by weight | 1 | 1 | 1 | 1 | 1 | 1 | 1 |
| Aroma oil | parts by weight | 7 | 7 | 7 | 7 | 7 | 7 | 7 |
| Zinc oxide | parts by weight | 3 | 3 | 3 | 3 | 3 | 3 | 3 |
| Cresol/formaldehyde condensate | parts by weight | 3 |  | 3 | 3 | 3 | 4 | 3 |
| Modified resorcinol/formaldehyde condensate | parts by weight |  | 3 |  |  |  |  |  |
| Methylene donor | parts by weight | 6 | 6 | 6 | 6 | 6 | 12 | 6 |
| Sulfur | parts by weight |  |  |  | 6 | 6 | 6 | 2 |
| Vulcanization accelerator (1) | parts by weight |  |  |  | 2.2 |  | 2.2 | 1.5 |
| Vulcanization accelerator (2) | parts by weight |  |  |  |  |  |  |  |
| Vulcanization accelerator (3) | parts by weight |  |  |  |  |  |  |  |
| Peroxide | parts by weight | 3 | 3 |  |  |  |  |  |
| Resin crosslinking agent | parts by weight |  |  | 3 |  |  |  |  |
| Peel strength (laminate with Film A) |  | 5 | 5 | 5 | 1 | 5 | 5 | 2 |
| Tire separation (laminate with Film A) |  | Good | Good | Good | Good | Good | Good | Good |
| Tire destruction (laminate with Film A) |  | Good | Good | Good | Good | Good | Good | Good |
| Peel strength (laminate with Film C) |  | 5 | 5 | 5 | 1 | 5 | 5 | 2 |
| Tire separation (laminate with Film C) |  | Good | Good | Good | Good | Good | Good | Good |
| Tire destruction (laminate with Film C) |  | Good | Good | Good | Good | Good | Good | Good |

TABLE 4

Recipes and evaluation results of rubber compositions

|  |  | Example 8 | Example 9 | Comparative Example 1 | Comparative Example 2 | Comparative Example 3 | Comparative Example 4 | Comparative Example 5 |
|---|---|---|---|---|---|---|---|---|
| Styrene/butadiene rubber | parts by weight | 50 | 50 | 50 | 50 | 50 | 50 | 50 |
| Natural rubber | parts by weight | 50 | 50 | 50 | 50 | 50 | 50 | 50 |
| Carbon black | parts by weight | 60 | 60 | 60 | 60 | 60 | 60 | 60 |
| Stearic acid | parts by weight | 1 | 1 | 1 | 1 | 1 | 1 | 1 |
| Aroma oil | parts by weight | 7 | 7 | 7 | 7 | 7 | 1 | 7 |
| Zinc oxide | parts by weight | 3 | 3 | 3 | 3 | 3 | 3 | 3 |
| Cresol/formaldehyde condensate | parts by weight | 3 | 3 |  | 0.4 | 25 | 10 | 1 |
| Modified-resorcinol/formaldehyde condensate | parts by weight |  |  |  |  |  |  |  |
| Methylene donor | parts by weight | 6 | 6 |  | 0.4 | 100 | 4 | 11 |
| Sulfur | parts by weight | 2 | 2 | 3 | 3 | 3 | 3 | 3 |
| Vulcanization accelerator (1) | parts by weight |  |  | 1 | 1 | 1 | 1 | 1 |
| Vulcanization accelerator (2) | parts by weight | 1.5 | 1.5 |  |  |  |  |  |
| Vulcanization accelerator (3) | parts by weight |  | 0.5 |  |  |  |  |  |
| Peroxide | parts by weight |  |  |  |  |  |  |  |
| Resin crosslinking agent | parts by weight |  |  |  |  |  |  |  |
| Peel strength (laminate with Film A) |  | 3 | 4 | 0 | 0 | 5 | 0 | 0 |
| Tire separation (laminate with Film A) |  | Good | Good | Bad | Bad | Good | Bad | Bad |
| Tire destruction (laminate with Film A) |  | Good | Good | — | — | x | — | — |
| Peel strength (laminate with Film C) |  | 3 | 4 | 0 | 0 | 5 | 0 | 0 |
| Tire separation (laminate with Film C) |  | Good | Good | Bad | Bad | Good | Bad | Bad |
| Tire destruction (laminate with Film C) |  | Good | Good | — | — | Bad | — | — |

TABLE 5

Recipes and evaluation results of rubber compositions

|  |  | Example 10 | Example 11 | Example 12 | Example 13 | Example 14 |
|---|---|---|---|---|---|---|
| Styrene/butadiene rubber | parts by weight | 50 | 50 | 50 | 50 | 50 |
| Natural rubber | parts by weight | 50 | 50 | 50 | 50 | 50 |
| Carbon black | parts by weight | 60 | 60 | 60 | 60 | 60 |
| Stearic acid | parts by weight | 1 | 1 | 1 | 1 | 1 |
| Aroma oil | parts by weight | 7 | 7 | 7 | 7 | 7 |
| Zinc oxide | parts by weight | 3 | 3 | 3 | 3 | 3 |
| Cresol/formaldehyde condensate | parts by weight |  |  |  |  |  |
| Modified-resorcinol/formaldehyde condensate | parts by weight | 2 | 2 | 2 | 2 | 3 |

TABLE 5-continued

Recipes and evaluation results of rubber compositions

| | | Example 10 | Example 11 | Example 12 | Example 13 | Example 14 |
|---|---|---|---|---|---|---|
| Methylene donor | parts by weight | 4 | 4 | 6 | 6 | 6 |
| Sulfur | parts by weight | 2 | 4 | 6 | 8 | 2 |
| Vulcanization accelerator (1) | parts by weight | 2.2 | 2.2 | 2.2 | 2.2 | |
| Vulcanization accelerator (2) | parts by weight | | | | | 1.5 |
| Vulcanization accelerator (3) | parts by weight | | | | | |
| Peroxide | oarts by weight | | | | | |
| Resin crosslinking agent | parts by weight | | | | | |
| Peel strength (laminate with Film A) | | 5 | 5 | 5 | 5 | 5 |
| Tire separation (laminate with Film A) | | Good | Good | Good | Good | Good |
| Tire destruction (laminate with Film A) | | Good | Good | Good | Good | Good |
| Peel strength (laminate with Film B) | | 6 | 6 | 6 | 6 | 6 |
| Tire separation (laminate with Film B) | | Good | Good | Good | Good | Good |
| Tire destruction (laminate with Film B) | | Good | Good | Good | Good | Good |
| Peel strength (laminate with Film C) | | 5 | 5 | 5 | 5 | 5 |
| Tire separation (laminate with Film C) | | Good' | Good | Good | Good | Good |
| Tire destruction (laminate with Film C) | | Good | Good | Good | Good | Good |

TABLE 6

Recipes and evaluation results of rubber compositions

| | | Example 15 | Example 16 | Example 17 | Example 18 | Example 19 | Example 20 | Example 21 |
|---|---|---|---|---|---|---|---|---|
| Styrene/butadiene rubber | parts by weight | | | | | | | |
| Natural rubber | parts by weight | 100 | 25 | 5 | | | | |
| Butadiene rubber | parts by weight | | 75 | 95 | 100 | 95 | 75 | |
| Isoprene rubber | parts by weight | | | | | 5 | 25 | 100 |
| Carbon black | parts by weight | 60 | 60 | 60 | 60 | 60 | 60 | 60 |
| Stearic acid | parts by weight | 1 | 1 | 1 | 1 | 1 | 1 | 1 |
| Aroma oil | parts by weight | 7 | 7 | 7 | 7 | 7 | 7 | 7 |
| Zinc oxide | parts by weight | 3 | 3 | 3 | 3 | 3 | 3 | 3 |
| Cresol/formaldehyde condensate | parts by weight | | | | | | | |
| Modified resorcinol/formaldehyde condensate | parts by weight | 3 | 3 | 3 | 3 | 3 | 3 | 3 |
| Methylene donor | parts by weight | 6 | 6 | 6 | 6 | 6 | 6 | 6 |
| Sulfur | parts by weight | 2 | 2 | 2 | 2 | 2 | 2 | 2 |
| Vulcanization accelerator (1) | parts by weight | | | | | | | |
| Vulcanization accelerator (2) | parts by weight | 1.5 | 1.5 | 1.5 | 1.5 | 1.5 | 1.5 | 1.5 |
| Vulcanization accelerator (3) | parts by weight | | | | | | | |
| Peroxide | parts by weight | | | | | | | |
| Resin crosslinking agent | Parts by weight | | | | | | | |
| Peel strength (laminate with Film A) | | 5 | 6 | 6 | 5 | 6 | 6 | 5 |
| Tire separation (laminate with Film A) | | Good | Good | Good | Good | Good | Good | Good |
| Tire destruction (laminate with Film A) | | Good | Good | Good | Good | Good | Good | Good |
| Peel strength (laminate with Film C) | | 5 | 6 | 6 | 5 | 6 | 6 | 5 |
| Tire separation (laminate with Film C) | | Good | Good | Good | Good | Good | Good | Good |
| Tire destruction (laminate with Film C) | | Good | Good | Good | Good | Good | Good | Good |

Evaluation results of Examples 1 through 21 were all favorable.

Comparative Example 1 does not contain a cresol/formaldehyde condensate and a methylene donor and corresponds to a conventional art. Tire separation occurred.

Comparative Example 2 has the low content of a cresol/formaldehyde condensate. Tire separation occurred.

Comparative Example 3 has the high content of a cresol/formaldehyde condensate. There was no tire separation but tire destruction occurred.

In Comparative Example 4, the ratio of the methylene donor content to the cresol/formaldehyde condensate content is small; tire separation occurred.

In Comparative Example 5, the ratio of the methylene donor content to the cresol/formaldehyde condensate content is large; tire separation occurred.

Examples 10 to 14 demonstrate that a combination of a film containing an ethylene/vinyl alcohol copolymer (Film B) and a rubber composition containing a resorcinol/formaldehyde condensate is especially good from the viewpoint of the tire separation.

Examples 15 to 21 demonstrate that as a rubber component the use of a combination of a butadiene rubber and a natural rubber, or a combination of a butadiene rubber and an isoprene rubber, is especially good from the viewpoint of the tire separation.

INDUSTRIAL APPLICABILITY

A pneumatic tire according to the present invention can be utilized favorably as an automobile tire. A laminate according to the present invention can be utilized favorably for producing a pneumatic tire.

The invention claimed is:
1. A pneumatic tire comprising as an inner liner material a laminate composed of a film of a thermoplastic resin wherein the thermoplastic resin is at least one member selected from the group consisting of poly(vinyl alcohol), an ethylene-vinyl alcohol copolymer, nylon 6, nylon 66, nylon 11, nylon 12, nylon 610, nylon 612, nylon 6/66, nylon MXD6, and nylon 6T or a thermoplastic elastomer composition wherein the thermoplastic elastomer composition comprises a thermoplastic resin component and an elastomer component dispersed in the thermoplastic resin component; the thermoplastic resin component is at least one member selected from the group consisting of poly(vinyl alcohol), an ethylene-vinyl alcohol copolymer, nylon 6, nylon 66, nylon 11, nylon 12, nylon 610, nylon 612, nylon 6/66, nylon MXD6 and nylon 6T; and the elastomer component is at least one member selected from the group consisting of a brominated isobutylene-p-methylstyrene copolymer, a maleic anhydride-modified ethylene-α-olefin copolymer, an ethylene-glycidyl methacrylate copolymer and a maleic anhydride-modified ethylene-ethyl acrylate copolymer and a layer of a rubber composition, wherein said film is in direct contact with said layer of a rubber composition and wherein the rubber composition comprises 100 parts by weight of a rubber component, wherein the rubber component is at least one member selected from the group consisting of natural rubber, isoprene rubber, epoxidized natural rubber, styrene/butadiene rubber, butadiene rubber, acrylonitrile butadiene rubber, hydrogenated acrylonitrile butadiene rubber, and hydrogenated styrene/butadiene rubber, 0.5 to 4 parts by weight of a condensate between a compound expressed by formula (1):

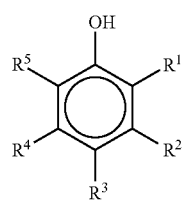

(1)

wherein $R^1$, $R^2$, $R^3$, $R^4$ and $R^5$ are hydrogen, a hydroxyl group or a C1 to C8 alkyl group, and formaldehyde, 0.25 to 40 parts by weight of a methylene donor, wherein the methylene donor is a modified etherified methylolmelamine, and a vulcanizing agent; and a weight ratio of the methylene donor to the condensate is 0.5 to 10, and the vulcanizing agent is sulfur or an organic peroxide.

2. The pneumatic tire according to claim 1, wherein the vulcanizing agent is sulfur, and the rubber composition does not contain a vulcanization accelerator.

3. The pneumatic tire according to claim 1, wherein the vulcanizing agent is sulfur, the rubber composition further contains a vulcanization accelerator, the content of the condensate is more than 3 parts by weight but not more than 4 parts by weight based on 100 parts by weight of the rubber component, and the content of the methylene donor is more than 1.5 parts by weight but not more than 40 parts by weight based on 100 parts by weight of the rubber component.

4. The pneumatic tire according to claim 1, wherein the vulcanizing agent is sulfur, the rubber composition further contains a vulcanization accelerator, the content of the condensate is 0.5 to 3 parts by weight based on 100 parts by weight of the rubber component, the content of the methylene donor is 0.25 to 30 parts by weight based on 100 parts by weight of the rubber component, the content of sulfur is less than 4 parts by weight based on 100 parts by weight of the rubber component, and the content of the vulcanization accelerator is more than 0 part by weight but less than 2.1 parts by weight based on 100 parts by weight of the rubber component.

5. The pneumatic tire according to claim 4, wherein the vulcanization accelerator is the compound having a structure of sulfenamide, and the content of the compound having a structure of sulfenamide is more than 0 part by weight but less than 1.5 parts by weight.

6. The pneumatic tire according to claim 5, wherein the rubber composition contains as the vulcanization accelerator a compound having a structure of sulfenamide and a compound having a structure of thiuram, and the content of the compound having a structure of thiuram is more than 0 part by weight but less than 0.6 part by weight.

7. The pneumatic tire according to claim 1, wherein in formula (1) at least one of $R^1$, $R^2$, $R^3$, $R^4$ and $R^5$ is a C1 to C8 alkyl group, and the remainder are hydrogen or a C1 to C8 alkyl group.

8. The pneumatic tire according to claim 1, wherein the condensate is a compound expressed by formula (2):

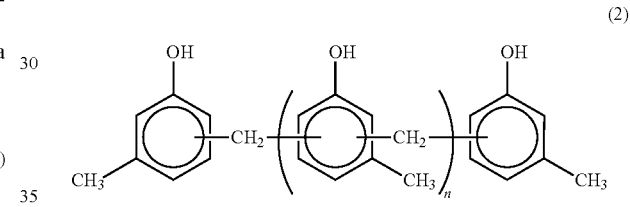

(2)

wherein n is an integer of 1 to 20.

9. The pneumatic tire according to claim 1, wherein in formula (1) at least one of $R^1$, $R^2$, $R^3$, $R^4$ and $R^5$ is a hydroxyl group, and the remainder is hydrogen or a C1 to C8 alkyl group.

10. The pneumatic tire according to claim 9, wherein the condensate is a compound expressed by formula (3):

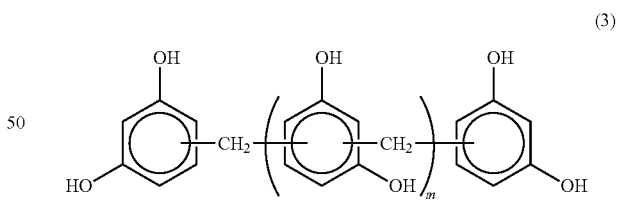

(3)

wherein m is an integer of 1 to 20.

11. The pneumatic tire according to claim 9, wherein the thermoplastic resin comprises an ethylene-vinyl alcohol copolymer having an ethylene content of 5 to 55% by mol, and the content of the ethylene-vinyl alcohol copolymer is 5 to 100% by weight based on the total amount of the thermoplastic resin.

12. The pneumatic tire according to claim 9, wherein the thermoplastic elastomer composition comprises the thermoplastic resin component and the elastomer component dispersed in the thermoplastic resin component, the thermoplastic resin component comprises an ethylene-vinyl alcohol copolymer having an ethylene content of 5 to 55% by mol, and the content of the ethylene-vinyl alcohol copolymer is 5 to 100% by weight based on the total amount of the thermoplastic resin component.

13. The pneumatic tire according to claim 1, wherein the rubber component comprises a butadiene rubber selected from the group consisting of styrene/butadiene rubber, butadiene rubber, acrylonitrile butadiene rubber, hydrogenated acrylonitrile butadiene rubber, and hydrogenated styrene/butadiene rubber.

14. The pneumatic tire according to claim 13, wherein the rubber component comprises 10 to 100% by weight of the butadiene rubber selected from the group consisting of styrene/butadiene rubber, butadiene rubber, acrylonitrile butadiene rubber, hydrogenated acrylonitrile butadiene rubber, and hydrogenated styrene/butadiene rubber based on the total amount of the rubber component.

15. An inner liner material comprising a laminate comprising a film of a thermoplastic elastomer composition wherein the thermoplastic elastomer composition comprises a thermoplastic resin component and an elastomer component dispersed in the thermoplastic resin component; the thermoplastic resin component is at least one member selected from the group consisting of poly(vinyl alcohol), an ethylene-vinyl alcohol copolymer, nylon 6, nylon 66, nylon 11, nylon 12, nylon 610, nylon 612, nylon 6/66, nylon MXD6 and nylon 6T; and the elastomer component is at least one selected from the group consisting of a brominated isobutylene-p-methylstyrene copolymer, a maleic anhydride-modified ethylene-α-olefin copolymer, an ethylene-glycidyl methacrylate copolymer and a maleic anhydride-modified ethylene-ethyl acrylate copolymer and a layer of a rubber composition, wherein the rubber composition comprises 100 parts by weight of a rubber component, wherein the rubber component is at least one member elected from the group consisting of natural rubber, isoprene rubber, epoxidized natural rubber, styrene/butadiene rubber, butadiene rubber, acrylonitrile butadiene rubber, hydrogenated acrylonitrile butadiene rubber, and hydrogenated styrene/butadiene rubber, 0.5 to 4 parts by weight of a condensate between a compound expressed by formula (1):

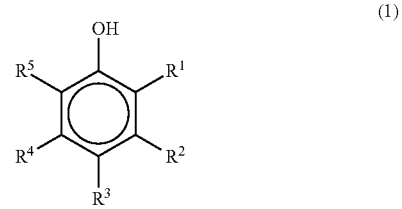

(1)

wherein $R^1$, $R^2$, $R^3$, $R^4$ and $R^5$ are hydrogen, a hydroxyl group or a C1 to C8 alkyl group, and formaldehyde, 0.25 to 40 parts by weight of a methylene donor, wherein the methylene donor is a modified etherified methylolmelamine, and a vulcanizing agent; and a weight ratio of the methylene donor to the condensate is 0.5 to 10.

16. The inner liner material according to claim 15, wherein the condensate is a compound expressed by formula (3):

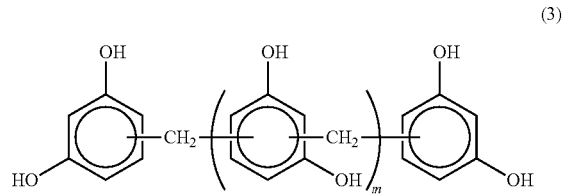

(3)

wherein m is an integer of 1 to 20.

* * * * *